United States Patent [19]

Newcamp et al.

[11] Patent Number: 4,668,272
[45] Date of Patent: May 26, 1987

[54] SUPPORT AND DRIVE SYSTEM FOR ROTATING LIQUEFACTION VESSEL

[75] Inventors: George C. Newcamp, Pittsburgh; Robert F. Johnston, Jr., Mt. Lebanon; John F. McConnell, Green Tree; Paul R. Ross, Jr., Penn Hills; Richard A. Caripolti, Lower Burrell, all of Pa.; John W. Peter, Loveland, Ohio

[73] Assignee: PPG Industries, Inc., Pittsburgh, Pa.

[21] Appl. No.: 815,699

[22] Filed: Jan. 2, 1986

[51] Int. Cl.⁴ .............................................. C03B 3/00
[52] U.S. Cl. ...................................... 65/335; 65/135; 65/347; 222/168; 222/593; 266/204
[58] Field of Search .................. 266/204; 65/134, 135, 65/178, 335, 337, 347; 222/168, 593

[56] References Cited

U.S. PATENT DOCUMENTS

| 908,151 | 12/1908 | Shwenzfeier . | |
|---|---|---|---|
| 1,870,636 | 8/1932 | McIntyre et al. . | |
| 1,881,117 | 10/1932 | Brackelsberg . | |
| 2,007,755 | 7/1935 | Ferguson . | |
| 2,555,578 | 9/1941 | Baker . | |
| 2,834,157 | 5/1958 | Bowes . | |
| 3,345,058 | 10/1967 | Pere | 266/241 |
| 3,510,115 | 5/1970 | Foex et al. | 432/116 |
| 3,917,479 | 11/1975 | Sayce et al. | 75/10 R |
| 4,261,553 | 4/1981 | Jeffes | 266/204 |
| 4,381,934 | 5/1983 | Kunkle et al. | 65/135 |

Primary Examiner—Robert Lindsay
Attorney, Agent, or Firm—Dennis G. Millman

[57] ABSTRACT

A rotary heating apparatus, for example, for liquefying glass batch or the like, is provided with dynamic stability by isolating structural support elements from vessel elements that are subject to thermal distortion and by supporting the vessel so as to be self-centering. The preferred embodiment entails a support ring separate from the vessel, rotatably supported at an elevation above the center of gravity of the vessel, and attached to a lower portion of the vessel by way of a plurality of link rods. Horizontal force is applied to the support ring to damp oscillations of the vessel. Rotation of the ring may be on a conical track to aid self-centering.

27 Claims, 1 Drawing Figure

U.S. Patent May 26, 1987 4,668,272
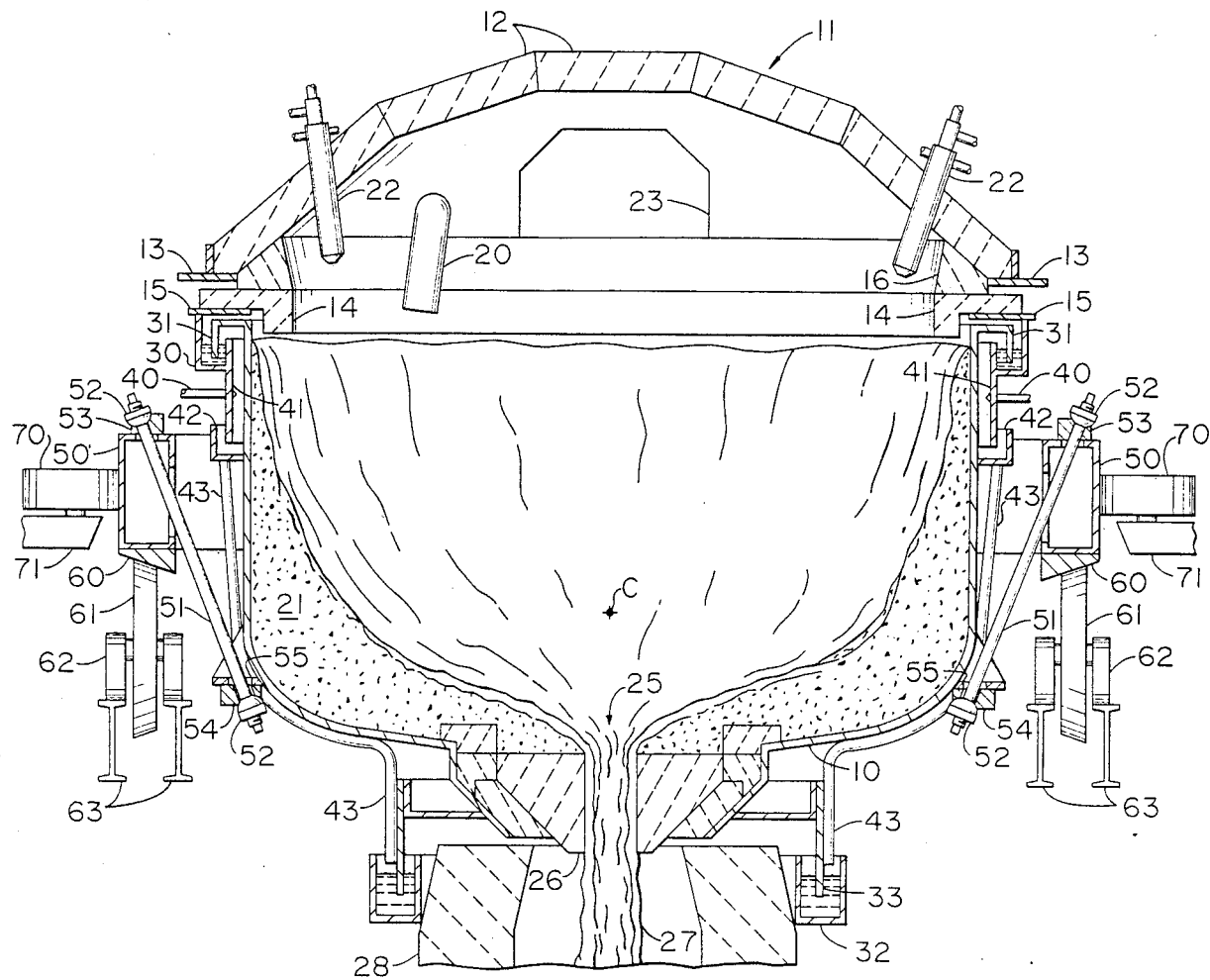

SUPPORT AND DRIVE SYSTEM FOR ROTATING LIQUEFACTION VESSEL

BACKGROUND OF THE INVENTION

This invention relates to apparatus for heating material, preferably for liquefying glass batch or the like as disclosed in U.S. Pat. No. 4,381,934 (Kunkle et al.), by means of a rotating vessel. A rotating vessel having a vertical axis is disclosed as the preferred embodiment in that patent. Similarly oriented rotary melters are also shown, for example, in U.S. Pat. Nos. 2,007,755 (Ferguson), 2,834,157 (Bowes), and 3,917,479 (Sayce et al.). Such arrangements may be satisfactory for operation on a relatively small scale, but when such a process is carried out on a commercial production scale dynamic instabilities may arise in the rotating apparatus that have the potential to put severe stress on the restraining structure. One source of these instabilities may be non-uniform distribution of material in the vessel. Another may be thermal warpage of the vessel. As long as the mass center of the rotating vessel and its contents is on the vertical axis of rotation, the system is stable. But if the mass center deviates from the axis of rotation, the system attempts to bring the two into conformity, which can force the vessel out of its intended alignment and set up oscillations and vibrations. Prior art approaches typically involve attempts to restrain the rotating vessel from any movement out of its intended alignment, but with a commercial scale vessel the forces entailed by such an attempt can be so great that the vessel or other structural elements are distorted or deflected, setting up other modes of vibration or oscillation. Also, feeding batch materials to a precise location with the vessel can be difficult if its motion is unstable. It would be desirable if the apparatus economies that result from the liquefaction process of the Kunkle et al. patent could be preserved by providing practical means for supporting and rotating a relatively massive vessel with stability.

SUMMARY OF THE INVENTION

In the present invention a support and drive arrangement is provided whereby a massive vessel rotated about a vertical axis is made dynamically self-stabilizing. The invention involves several novel aspects which in combination comprise the preferred embodiment.

One aspect is the separation of the vessel from its support means. The container portion of the vessel, or drum, is spaced from an encircling support table with radial freedom of movement therebetween, thus isolating the support structure from thermal expansion and warpage effects that may be experienced by the drum. Although motion is permitted therebetween, coaxiallity of the vessel and the support structure is preserved. The support table is mounted for rotation about a substantially vertical axis coincident with the cylindrical axis of the vessel.

In another aspect, support for the drum is provided at an elevation above the mass center of the drum and its contents, and the drum is mounted with freedom for its vertical axis to oscillate. The result is a pendulum-like effect that permits self-centering and avoids absolute restraint. If the mass center deviates from the intended axis for rotation, gravity pulls the mass center toward the intended axis. On the other hand, a center of gravity above the plane of support would create an unstable, inverted pendulum situation. Attempts to totally restrain the system against movement of the mass center would produce unduly high stresses in a large scale apparatus.

A bias against gross lateral displacement of the vessel is provided by a conical orientation of the support surfaces, that is, the surface of the support table that contacts supporting rollers slopes downwardly toward the center of the vessel. Thus total reliance on lateral restraint means to keep the vessel in position is avoided. The load bearing surfaces of the support rollers are also preferably conical, with the apex of each cone falling at the axis of rotation of the vessel, so that the tangential velocities of the rollers match that of the support surface along the lines of contact therebetween, thereby reducing wear, noise, and vibration.

In the preferred embodiment, support is provided above the mass center by a support structure separate from the drum and attached to the drum at a lower elevation. Elongated link means extend from the support structure to the points of attachment to the drum. Because of an inward tapering of lining material within the drum, the lower portions of the drum are more insulated from the interior heat than the upper portions. Therefore, the link means are attached to lower portion of the drum because of the stable geometry there. Upper portions of the drum can be subject to thermal expansion and contraction and can sometimes become deformed, so that attachment of the support system there would have the potential of introducing unsymmetrical conditions, and thus instability, into the rotating system. Because of the attachment to the lower, relatively cool portion of the drum, and the preference to support the drum from above its center of gravity, the link means preferably extend downwardly from the support structure to their points of attachment to the drum. The link means also provide flexibility in the radial direction, thereby achieving the advantage of structurally isolating the support means from the drum. This arrangement advantageously permits thermal expansion or warpage of the drum, but maintains the drum fixed relative to the support means. The link means preferably comprise a plurality of rods, but could comprise plates, cables, straps, or the like.

Another important aspect of preferred embodiments is the provision of horizontal restraining means acting on the support table. The horizontal restraining means may comprise wheels separate from the vertical support wheels on which the table is supported. Although the present system does not attempt to provide absolute horizontal restraint, a major stabilizing effect is provided to the system by exerting resilient horizontal centering forces on the support table to control excursions and to damp oscillations (i.e., swinging motions). Providing separate propulsion for rotation of the support table through the horizontal restraining means advantageously enables the load-bearing vertical support means to be lubricated, and allows for various configurations and materials for the vessel support system.

These and other advantages of the invention will be apparent from the drawing and the detailed description of the preferred embodiment which follows.

THE DRAWING

The FIGURE is a vertical cross-section of a preferred embodiment of rotary heating apparatus incorporating the improvements of the present invention.

DETAILED DESCRIPTION OF THE PREFERRED EMBODIMENT

This description of a particular preferred embodiment relates to a process for liquefying glass batch but it should be understood that the invention is applicable to other processes as well. Details of the specific process maybe found in U.S. Pat. No. 4,381,934 of Kunkle et al. and need not be repeated here.

Referring to the specific embodiment shown in the figure, the basic structure of the melting vessel is a drum 10 which may be fabricated of steel and which has a generally cylindrical side configuration, a generally open top, and a bottom portion that is closed except for a drain outlet. The drum 10 is mounted for rotation about a vertical axis in a manner to be described in detail hereinbelow. A substantially enclosed cavity is formed within the melting vessel by means of a lid structure generally designated as 11 which is provided with stationary support. The lid 11 may be constructed with a variety of materials and configurations as would be known to those of skill in the furnace construction art. The preferred arrangement depicted in the figure is an upwardly domed, sprung arch construction fabricated from a plurality of refractory blocks 12. In the typical arch construction shown, the arch blocks rest on a peripheral support structure 13. The area between the stationary lid and rotating vessel may be closed in various ways. In the arrangement shown in the drawing, plate blocks 14 extend slightly below upper rim of the drum 10 and are supported by stationary support plate 15. Seal blocks 16 may be provided to close the gap between the arch blocks 12 and the plate blocks 14. It should be understood that monolithic and flat suspended designs and other materials, either cooled or uncooled, could be employed for the lid.

Batch materials, preferably in a pulverulent state, may be fed into the cavity of the heating vessel by means of a water cooled chute 20. A layer 21 of the batch material is retained on the interior walls of the drum 10 to act as an insulating lining. As the drum is rotating, the feed chute 20 directs batch material onto upper portions of the lining 21. Heating for liquefying the batch material may be provided by one or more burners 22 extending through the lid 11. Preferably a plurality of burners 22 are arranged around the perimeter of the lid so as to direct their flames toward a wide area of the lining 21. The burners are preferably water cooled to protect them from the harsh environment within the vessel. Exhaust gases escape from the vessel through an opening 23 in lid 11 or through the bottom outlet 25. As batch material on the surface of lining 21 liquefies it flows down the sloped lining to a central outlet opening 25 at the bottom of the vessel. The outlet 25 may be fitted with a refractory ceramic bushing 26. A stream of liquefied material 27 falls freely from the vessel into a stationary receptacle 28 and may thereafter be subjected to additional treatment to complete the melting process.

The drawing shows several optional features that are included in the preferred embodiment. At the interface between the upper rim of the rotating drum 10 and the stationary lid 11 an atmosphere seal may be provided comprised of a stationary, circular, water-containing trough and a circular flange member 31 extending downwardly into the trough from the rotating drum. A similar stationary water trough 32 and flange 33 extending downwardly from the rotating drum may be provided at the lower end of the drum.

Another optional feature associated with the preferred embodiment is an arrangement to cool the upper rim portion of the drum 10 in the event that irregular retention of the lining 21 on the upper interior portion of the drum causes undue exposure of the upper rim portion of the drum to the heat. To this end, a stream of water may be sprayed against the exterior of the upper portion of the drum. The water spray may be supplied with water by way of conduits 40, and the spray may be confined to the space closely adjacent to the drum by means of a spray shield 41. Spent water may be collected in a circular trough 42 and drained by way of conduits 43 that extend down along the slides of and rotate with the drum 10. Discharge of water from the conduits 43 may conveniently be provided into the water trough 32 of the bottom atmosphere seal.

The base on which the drum 10 is rotatably supported and driven is a support table 50 which, as shown in the drawing, may be configured as a hollow ring of generally rectangular cross-section. The support ring 50 encircles the drum and is spaced therefrom. The link means for connecting the support ring 50 to the drum 10 in this embodiment comprise a plurality of support rods 51. The number and size of the rods 51 are inversely related and depend upon the weight of a particular drum when fully loaded and the transient forces expected to be borne. Three rods could theoretically support the drum, but the use of more (preferably eight or more) rods permits a bicycle spoke type of arrangement to be employed whereby rotating and swinging of the drum 10 relative to the ring 50 is counteracted. In such an arrangement the rods do not lie in radial planes of the drum, but rather extend along vertical planes that do not intersect the vertical axis of the drum, with the planes of adjacent rods passing on opposite sides of the vertical axis of the drum. With larger vessels the number of rods may be increased accordingly in order to distribute the load, and it is contemplated that the number of rods may be on the order of twenty-four in an embodiment of the type shown in the drawing. Rods are the preferred form of link means because they provide little obstruction to the sides of the drum, thereby permitting access for construction and maintenance, providing free circulation of air, and avoiding accumulation of any spilled materials. Because of the isolation between the support mechanism and the vessel provided by elongated link means such as the rods 51, the support mechanism can act as a self-centering system regardless of the configuration of the vessel and its contents.

The rods 51 are preferably held in place at each end by spherical ended nuts 52 which are in turn received in spherical sockets in upper and lower support blocks 53 and 54 respectively. This arrangement causes the rods 51 to carry tensile loads only. The upper support blocks 53 are mounted on the support ring 50 at an elevation above the center of gravity "C" of the loaded vessel in accordance with the preference to support the vessel from an elevation above its center of gravity. The lower support blocks 54 are affixed to a peripheral ring 55 or the like, which is attached to the drum 10 at an elevation lower than the elevation of the upper support blocks 53. Because the lining material 21 tapers to a greater thickness at the bottom of a cylindrical drum as shown in the drawing, the center of gravity will usually be within the lower half of the height of the drum. Accordingly, the elevation of support may alternatively be expressed as being at the upper half of the height of the drum. Elongating the rods 51, within practical limits of the surrounding structure, can be advantageous for better isolation of the drum from the support system because longer, and thus more vertical, rods avoid transmitting drum distortion along the length of a rod.

Attachment of the link means such as rods 51 to the drum preferably is located at a region of the drum that is relatively cool and therefore less susceptible to thermal warpage. The thickening of the lining 21 toward the bottom of the cylindrical drum renders lower portions of the drum more desirable for the attachment locations. Although attachment at the upper half of the drum may sometimes be acceptable, it is preferred to make the attachment at the lower half. In the most preferred arrangement, the attachment is at or below the elevation of the center of gravity "C" of the vessel loaded with a normal amount of material including the lining, which would usually be in a reliably stable portion of the vessel.

The vessel 10, instead of the generally cylindrical shape shown may be provided with other shapes such as a downwardly converging frustoconical shape or a stepped shape as shown in U.S. Pat. No. 4,496,387 (Heithoff et al.). In such cases, the center of gravity may not lie within the lower half of the vessel, but the preferred elevation of support would be above the center of gravity, and the elevation of attachment to the vessel would be at the lower half.

The underside of the support ring 50 is provided with a tapered track 60 that makes rolling contact with a plurality of tapered wheels 61. The wheels 61 are rotatably carried by bearings 62 that are affixed to suitable stationary structural members such as beams 63. The wheels 61 carry the vertical load of the drum and its contents, and the number of wheels should be chosen accordingly to distribute the load, eight wheels being considered suitable in a typical commercial scale installation as shown in the drawing. The contact surface of the track 60 tapers downwardly toward the drum 10, thus being configured as a segment of a cone. The wheels 61 may be tapered at the same slope as the track, and together with the tapered track 60 bias the rotating vessel toward the center. The angle is chosen to avoid velocity differences along the line of contact, thus reducing wear and noise.

Lateral restraint is applied to the rotating drum 10 and support ring 50 by means of a plurality of wheels 70 bearing against the periphery of the support ring 50. The lateral restraint wheels 70 may be rotatably carried on rigid support means 71, which may be adjustable in the radial direction with respect to the drum 10. At least three lateral restraint wheels 70 are provided, and the wheels 70 are preferably resilient, most preferably pneumatic tires. At least one of the wheels 70 is driven by means of a motor (not shown) so as to rotate the support table 50 and thus the drum 10. Rather than serving as absolute restraint for the rotating elements, the wheels 70 serve to damp oscillation or other deviation of the drum axis from its intended locus. The wheels 70 thus serve as a primary centering force to the rotating system.

It should be evident that other variations and modifications as would be known to those of skill in the art, may be resorted to without departing from the scope of the invention as defined by the claims which follow.

We claim:

1. Apparatus for melting material comprising:
   a generally cylindrical vessel adapted to contain a quantity of material to be melted, oriented with a substantially vertical axis;
   means for feeding material into the vessel;
   means to heat the material within the vessel;
   support structure means spaced from an encircling the vessel and mounted for rotation substantially coaxially with the axis of the vessel; and
   link means joining the vessel to the support means and permitting radial expansion of the vessel relative to the support means.

2. The apparatus of claim 1 wherein the support means comprise a ring-like structure rotatably supported on support wheels.

3. The apparatus of claim 2 wherein the link means are attached to the support means at an elevation above the center of gravity of the vessel loaded with the material.

4. The apparatus of claim 3 wherein the link means are attached to a lower portion of the vessel.

5. The apparatus of claim 4 wherein the link means are attached to the vessel below the level of the center of gravity of the drum loaded with the material.

6. The apparatus of claim 4 wherein the link means comprise a plurality of elongated elements extending downwardly from the support means to the vessel.

7. The apparatus of claim 6 wherein the link means comprise a plurality of rods.

8. The apparatus of claim 7 wherein each rod is oblique to radial planes of the vessel.

9. The apparatus of claim 2 wherein the support wheels are tapered inwardly toward the axis of the vessel, and the surface of the support means contacted by the support wheels comprises a conical segment sloped downwardly toward the axis of the vessel.

10. The apparatus of claim 2 wherein the support ring is horizontally restrained by wheels bearing against a peripheral surface of the ring.

11. The apparatus of claim 5 further including lid means covering the upper end of the vessel and provided with stationary support.

12. The apparatus of claim 11 further including means associated with the lid for feeding the material to be heated into the vessel, and wherein the vessel is provided with opening means at its lower end for draining liquefied material from the vessel.

13. Apparatus for melting material comprising:
    a generally cylindrical vessel adapted to contain a quantity of material to be melted, oriented with a substantially vertical axis;
    means for feeding material into the vessel;
    means to heat the material within the vessel;
    support structure encircling the vessel and interfacing with rotation means for providing rotating support of the support structure at an elevation above the center of gravity of the vessel loaded with the material, the support structure being attached to the vessel at an elevation below the elevation of rotating support.

14. The apparatus of claim 13 wherein the elevation of attachment is below the center of gravity of the loaded vessel.

15. The apparatus of claim 13 wherein the elevation of rotating support lies at or above the upper half of the vessel, and the elevation of attachment is within the lower half of the vessel.

16. The apparatus of claim 13 wherein attachment between the support structure and the vessel is provided by aplurality of elongated link elements.

17. The apparatus of claim 13 wherein the apparatus further includes stationary lid means substantially closing the upper end of the vessel, the lid means having associated therewith means for feeding material into the vessel, and th vessel having an outlet in its lower portion for draining liquefied material from the vessel.

18. Apparatus for melting material comprising:
a generally cylindrical vessel adapted to contain a quantity of material to be melted, oriented with a substantially verticall axis;
means for feeding material into the vessel;
means to heat the material within the vessel;
support structure means encircling and attached to the vessel and resting on means for supporting the vessel for rotation about a substantially vertical axis, the elevation of the rotational support being above the center of gravity of the vessel loaded with the material, the portion of the vessel below said elevation of rotation support being free of horizontal restrain whereby the vertical axis of the vessel has freedom to oscillate;
means for damping oscillation of the vertical axis of the vessel by applying force on the support structure toward the vertical axis.

19. The apparatus of claim 18 wherein the support means include a ring-like structure, and the damping means include a plurality of wheels bearing horizontally against the ring-like structure.

20. The apparatus of claim 18 wherein the support means include a support surface in contact with rolling means, the support surface sloping downwardly toward the vertical axis of the vessel.

21. The apparatus of claim 20 wherein the support surface is sloped toward or below the center of gravity of the vessel loaded with material.

22. Apparatus for melting material comprising:
a generally cylindrical vessel adapted to contain a quantity of material to be melted, oriented with a substantially vertical axis;
means for feeding material into the vessel;
means to heat the material within the vessel;
support structure measn attached to the vessel and encircling the vessel at an elevation above the center of gravity of the vessel loaded with material, the support structure means having a support surface contacting roll means, the support surface sloping downwardly toward the vertical axis of the vessel.

23. The apparatus of claim 22 wherein the support surface slopes toward or below the center of gravity of the vessel loaded with material.

24. Apparatus for melting material comprising:
a vessel having generally upright cylindrical sides, a bottom, a central outlet in the bottom for discharging material from the vessel, lining material within the vessel tapering from a region near the upper edge of the sides to the outlet whereby the lining thickness is greater on the lower portion of the sides than the top portion;
means for feeding material into the vessel;
means to heat the material in the vessel;
link means, each affixed at one end to a lower portion of the vessel and affixed at an opposite end to a support structure encircling the vessel and rotatably supported at an elevation above the elevation of attachment of the links means to the vessel.

25. The apparatus of claim 24 wherein the support structure is generally circular and is spaced from the upper portion of the vessel.

26. The apparatus of claim 25 wherein the link means comprise a plurality of rods.

27. The apparatus of claim 26 wherein the ends of the rods are pivotably received in sockets.

* * * * *

UNITED STATES PATENT AND TRADEMARK OFFICE
CERTIFICATE OF CORRECTION

PATENT NO. : 4,668,272
DATED : May 26, 1987
INVENTOR(S) : George C. Newcamp, et al.

It is certified that error appears in the above-identified patent and that said Letters Patent is hereby corrected as shown below:

Claim 1, line 7, "an" should be --and--.

Claim 16, line 3, "aplurality" should be -- a plurality--.

Claim 17, line 5, "th" should be --the--.

Claim 18, line 4, "verticall" should be --vertical--.

Claim 18, line 14, "restrain" should be --restraint--.

Claim 22, line 7, "measn" should be --means--.

Claim 24, line 15, "links" should be --link--.

Signed and Sealed this

Third Day of July, 1990

*Attest:*

HARRY F. MANBECK, JR.

*Attesting Officer*  Commissioner of Patents and Trademarks